B. O'BRYAN.
Belt-Shifters and Tighteners.

No. 140,299. Patented June 24, 1873.

Witnesses.
Adam T. Root
D. M. Stauffer

Inventor.
Barnard O'Bryan,
per J. Stauffer Att.

UNITED STATES PATENT OFFICE.

BEARNARD O'BRYAN, OF MARIETTA, PENNSYLVANIA.

IMPROVEMENT IN BELT SHIFTERS AND TIGHTENERS.

Specification forming part of Letters Patent No. 140,299, dated June 24, 1873; application filed May 6, 1873.

*To all whom it may concern:*

Be it known that I, BEARNARD O'BRYAN, of Marietta, in the county of Lancaster and State of Pennsylvania, have invented a Combined Strap Shifter and Slackener on Machinery, of which the following is a specification:

The object of my invention is to shift the belt and to slacken or relax it in one operation or single movement of a lever. Belts or straps must necessarily be tightly stretched for running planing machines and saws, and when shifted in the ordinary way onto a loose pulley are worn by friction as well as the needless action of the loose pulley; hence additional devices have been employed to slacken the belt by means of a separate action. As the time thus lost, however brief, is often of vital importance, a means to stop the saw or planer at once, in numerous cases, is highly desirable. The accompanying drawings show the construction and operation of my device, in which—

Figure 1:
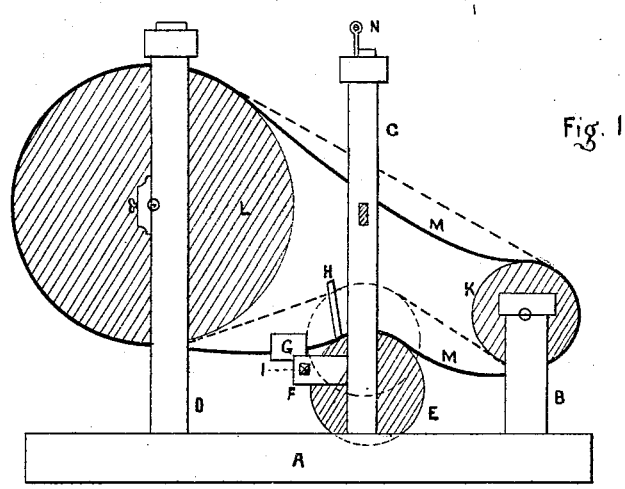
Figures 2, 3:
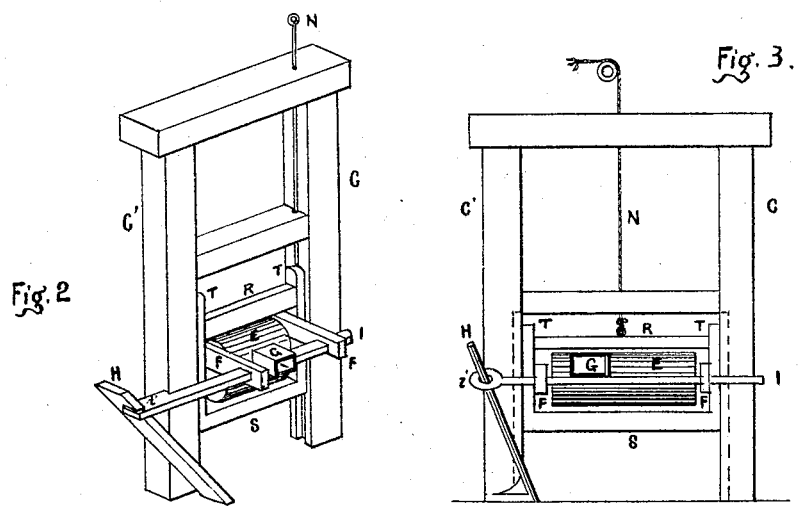

Figure 1 shows the ordinary driving-pulley wheel and belt-tightener; Fig. 2, a perspective view of the several parts; Fig. 3, a slight modification of the device.

My improvement consists in the arrangement of a sliding frame, R S, and the side pieces T, which fit and move vertically in grooved ways made on the inner face of the uprights c c'. This frame is drawn up by means of a rod or cord, N, connected with a foot or hand lever, and may be held in place by a rack or otherwise, so as to be readily tripped or disengaged. This frame also forms the bearing of the long pulley E, and rises and falls with it, to tighten or to relax the belt M resting upon it. Arms F are also connected with the sliding frame, and support a sliding bar, I, which is drawn out laterally by means of a head, i, fitting in or upon an oblique guide, H, as the frame rises to tighten the belt M, which passes through an open box, G, affixed to and sliding with the bar I, thus shifting the belt from the loose pulley K to the runner, at the same time the belt is tightened thereby. The moment the frame is tripped it falls down by its own weight with its pulley and belt-shifter, the sliding bar on its guide moving freely, so as not only to carry or shift the belt onto the loose pulley, but, at the same time, to slacken the belt so as to prevent all needless chafing, and stop the machinery at once by a single movement performed with ease and without loss of time.

I am aware that the mere shifting and tightening of the belt is not novel, but I am not aware that it has yet been done in a single motion producing the combined action herein described. Therefore,

What I claim as my invention, is—

The sliding frame T T R S with its arms or bearings, F, for the sliding bar I, with the guide-head i, the oblique guide H, in combination with the shifting-box G, and belt-tightening pulley E, all arranged and operated substantially in the manner and for the purpose described.

BEARNARD O'BRYAN.

Witnesses:
   A. EMSWILLER,
   E. D. ROATH.